United States Patent [19]

Josephson

[11] Patent Number: 5,623,660
[45] Date of Patent: Apr. 22, 1997

[54] SYSTEM FOR REGULATING ACCESS TO DATA BASE FOR PURPOSES OF DATA BASE MANAGEMENT

[76] Inventor: Jeffrey L. Josephson, 531 Eagelbrook Dr., Moorestown, N.J. 08057

[21] Appl. No.: 537,541

[22] Filed: Oct. 2, 1995

Related U.S. Application Data

[63] Continuation-in-part of Ser. No. 231,035, Apr. 22, 1994, abandoned.

[51] Int. Cl.$^6$ .................................................. G06F 13/00
[52] U.S. Cl. .................... 395/609; 395/200.09; 395/477; 395/478; 395/479; 395/490; 395/491; 395/610; 364/DIG. 1; 364/282.1; 364/286.4; 364/286.5
[58] Field of Search ............................... 395/600, 200.09, 395/848, 477, 478, 479, 490, 491; 364/DIG. 1

[56] References Cited

U.S. PATENT DOCUMENTS

| | | | |
|---|---|---|---|
| 4,627,019 | 12/1986 | Ng | 364/900 |
| 4,745,559 | 5/1988 | Willis et al. | 364/514 |
| 4,757,267 | 7/1988 | Riskin | 379/113 |
| 4,819,160 | 4/1989 | Tanka et al. | 364/300 |
| 5,113,499 | 5/1992 | Ankney et al. | 395/325 |
| 5,127,099 | 6/1992 | Zifferer et al. | 395/725 |
| 5,181,238 | 1/1993 | Medamana et al. | 379/95 |
| 5,185,887 | 2/1993 | Takahashi et al. | 395/600 |
| 5,191,611 | 3/1993 | Lang | 380/25 |
| 5,263,158 | 11/1993 | Janis | 395/600 |
| 5,263,165 | 11/1993 | Janis | 395/725 |

*Primary Examiner*—Thomas G. Black
*Assistant Examiner*—Jean R. Homere
*Attorney, Agent, or Firm*—Weiser & Associates, P.C.

[57] ABSTRACT

A data base is made accessible with a data base management system that not only regulates access to the data base, but which also promotes expansion (growth) of the data base on an ongoing basis as part of such regulation. For the purpose of developing leads for promoting sales efforts, a data base is provided which assembles the needs of users of the system, for access by other users to identify potential sales leads. The data base management system provides access to the needs compiled by the data base, identifying qualified leads, but only upon the condition that users of the system first identify their needs. In this way, a constant source of leads is made available, based upon the present and actual needs of other users, and the leads that are obtained are more likely to give rise to a useful result.

48 Claims, 5 Drawing Sheets

SYSTEM FOR REGULATING ACCESS TO DATA BASE FOR PURPOSES OF DATA BASE MANAGEMENT

This application is a continuation-in-part of application Ser. No. 08/231,035 filed Apr. 22, 1994, now abandoned.

BACKGROUND OF THE INVENTION

This invention relates generally to data base management systems, and in particular, to a system for regulating access to a data base so as to require an interactive exchange of data.

A variety of data bases have been developed to suit a variety of applications, to accumulate information useful in conjunction with such applications. Essentially, a data base is an assembled collection of information pertaining to a particular topic, which may subdivided into any of a number of topic headings (i.e., "fields" groups of fields, or files). The improvements of the present invention will be discussed in a commercial setting, for the collection of information pertaining to business opportunities and for disseminating information from the collected data base. However, such improvements will find equal applicability to other data bases, pertaining to other endeavors.

More specifically, the data base management system of the present invention will be described in conjunction with the identification of potential customers for specified goods and/or services to better direct the sales efforts of a particular business, i.e., a sales "lead" (a potential customer need that could be profitably satisfied by a vendor). The generation of leads has traditionally constituted a marketing and/or sales function performed either by an individual (for a smaller business concern), a department (for larger business concerns) or a third-party vendor. Regardless of size, the generation of leads is primarily supported, and indeed promoted by advertising, cold calling, direct mail, promotion, networking, related sales functions and innumerable other activities designed to identify, stimulate and qualify the demand for a particular product or service.

However, the costs associated with lead generation are significant, and often represent a sizeable portion of an operating budget. For example, a simple direct mail campaign to 1,000 prospects may typically cost on the order of $1,000.00, and might at best draw a 5% response rate. This limited response rate must then produce a sufficient amount of new business (i.e., sales) for the direct mail campaign to be considered successful. Basic advertising in a trade magazine may typically cost on the order of $5,000.00, and often draws no concurrent or qualified leads. Advertising of this nature seeks to promote lead generation in the future. Cold calling incurs a substantial expense, tends to draw a severely limited response, and is further prone to "burnout" of the sales representatives performing such a function. Other techniques for lead generation are often even less directed, and suffer from similar disadvantages.

Also to consider is that even after a lead has been generated, the quality of that lead will contribute to determining its potential for profitability. This is best illustrated when considering that industry studies presently suggest an average cost of $200.00 to identify a lead, followed by an average cost of $250.00 per lead for a sales representative to initially service the lead and identify its potential. The quality of a generated lead therefore becomes important since such costs must then form a component part of the overall cost of the product being sold, including lost revenues from sales efforts (resulting from leads) that are unsuccessful.

For this reason, efforts have been made to provide vendors with ways to obtain good, qualified leads that can minimize expenses, shorten sales cycles and increase revenues and profitability. This also tends to improve morale and enhance the effectiveness of sales personnel. Often, third party providers are consulted to provide businesses with qualified leads, based upon their experience in a given field (i.e., a consultant). As an alternative, available data base information is analyzed, employing sources such as the "Dodge" reports or the Dun and Bradstreet services. However, such leads are often secondary in nature, resulting from information derived for other purposes. Consequently, a relatively small proportion of the leads provided by such services will actually contribute to a successful sale, limiting their overall effectiveness and contributing to significant costs and employee dissatisfaction.

To provide a more targeted means for establishing leads for sale purposes, structured organizations have been attempted. One such example is "Ali Lassen's Leads Club", which is a national network of clubs seeking to attract individuals and businesses interested in trading leads on a regular basis. While these clubs do tend to promote the exchange of numerous leads among their members, there are a variety of limitations. First, active participation is voluntary and not mandatory. Consequently, the generation of leads is neither constant, predictable, nor assured for all members. There is no reliable system for ensuring that useful leads will be forthcoming. Second, such clubs tend to attract a limited cross-section of members, primarily limited to entrepreneurs and sales people. This tends to limit the scope of the leads available from such encounters, and it is for this reason that such clubs tend toward commercial and retail services rather than high value industrial sales.

There have also been efforts to automate the generation of useful leads for sales purposes. This has included automated advertising (both classified and products/situations wanted), and so-called "chat lines" allowing commercial discussions and exchanges of information. An example of this general approach is the "Forum" program, available from CompuServe. This system promotes on-line discussions of subjects of interest to its users. The system's strength is its ability to communicate high quality information to a large pool of users. Advertising is accepted as part of this service. However, the purpose of this system is not to generate leads, but rather to exchange information of interest to the system's users. Again, there is no system for ensuring, or even promoting the exchange of leads, and a limited cross-section of users is generally encountered.

It therefore remained of interest to develop a system that can positively identify useful leads for purposes of selling the goods and/or services of a particular business enterprise. A more effective identification of useful leads was needed to provide a more targeted and efficient sales effort, leading to savings in cost, increased revenue and improved employee morale. Such a system would also have the advantage of assisting a purchaser in finding suitable vendors for supplying its needs, avoiding unnecessary and/or redundant sales efforts not suited to such needs.

SUMMARY OF THE INVENTION

It is an object of the present invention to provide a system for managing a data base in a way which can expand the data base on an ongoing basis.

It is also an object of the present invention to provide a data base management system which can expand any of a variety of data bases, including empty or populated data bases, as well as data bases for developing leads for supporting sales efforts, or for other purposes.

It is also an object of the present invention to provide a system for managing a data base by regulating access to the data base so as to require an interactive exchange of data with that data base.

It is also an object of the present invention to provide a system for regulating access to a data base so as to require the addition of data to the data base prior to obtaining data from the data base.

It is also an object of the present invention to provide a system which can be used to develop leads for promoting sales efforts.

It is also an object of the present invention to provide a system for developing leads for promoting sales which are better qualified and more likely to result in a productive sale of goods and/or services.

It is also an object of the present invention to provide a system for developing leads for promoting sales that is automated, and which can be readily accessed.

It is also an object of the present invention to provide an automated system for developing leads for promoting sales which employs a data base particularly suited to the generation of such leads.

These and other objects which will become apparent are achieved in accordance with the present invention by providing a data base suited to a particular purpose (either containing data, or not yet containing data), and which is made accessible with a data base management system that not only regulates access to the data base, but which also promotes expansion (growth) of the data base on an ongoing basis as a result of such regulation.

As an example, and for the purpose of developing leads for promoting sales efforts, a data base is provided which assembles the needs of users of the system, for access by other users to identify potential sales leads. The data base management system regulates access to the needs compiled by the data base, identifying qualified leads, but only upon the condition that users of the system first add their needs to the data contained by the data base. In this way, a constant source of leads is made available, based upon the present and actual needs of other users. Since the data base contains the present needs of others, the leads that are obtained are more likely to give rise to a useful sale, making the leads obtained from such a system more reliable, and in turn, more cost effective and productive.

These and other objects are achieved in accordance with the present invention by providing a data base and a data base management system which are more fully described below, taken in conjunction with the following illustrations.

DETAILED DESCRIPTION OF PREFERRED EMBODIMENTS

Figure 1A:
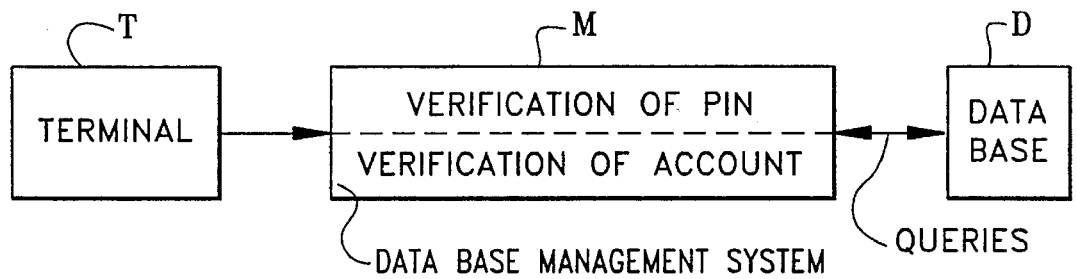
FIG. 1A is a block diagram showing an overview of prior systems for regulating access to a data base for purposes of managing the data base.

FIG. 1A shows an overall block diagram of a conventional system for accessing data, and for managing the access of such data. The system generally includes a terminal T for providing an interface with a user of the system, and a data base management system M for providing access to a desired data base D. In operation, the data base management system M serves to verify certain information prior to allowing access to the data base D. This could conventionally include verifications such as the entry of a dedicated personal identification number (PIN) to allow access only to intended users of the system (or some other security verification procedure) or a review of the user's account (to make sure the account is current) to allow access only to the users that have paid for the subscribed services.

As part of its operations, the data base management system M may rely on certain data for making its determinations. For example, a verification of the user's PIN may involve a search of valid PIN's associated with a particular data base. A verification of the user's account may similarly involve a search of accounting information associated with the data base. Such secondary data (i.e., the PIN or accounting information) may reside in the host computer which contains the primary data forming the data base D, which the user intends to access. However, the consultation of such secondary data is separate from the consultation of the primary data associated with the data base D. The user derives no useful information from the secondary data which is consulted, as distinguished from the primary data, which the user seeks to consult (i.e., query) to derive useful information.

Through operations of the conventional system of FIG. 1A, and following the verifications associated with the data base management system M (either responsive to consultation of the secondary data associated with the data base D, or a separate listing), the user is permitted access to the primary data of the data base D, for purposes of making desired queries and ascertaining relevant responses.

Figure 1B:
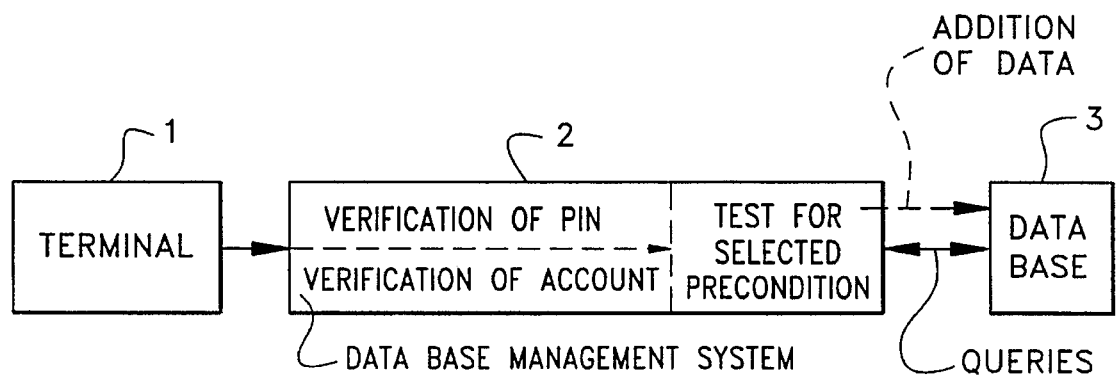
FIG. 1B is a block diagram showing an overview of the data base management system of the present invention.

FIG. 1B shows an overall block diagram of a system for accessing data, and for managing the access of data in accordance with the present invention. To this end, a terminal 1 provides an interface with a user of the system. The terminal 1 may constitute any of a variety of available devices for accessing a data base. In its most common form, the terminal 1 will be a personal or other general purpose computer provided with appropriate software for performing the operations to be described below.

The terminal 1, together with any associated software required for doing so, communicates with a data base management system 2 for providing access to a desired data base 3. This can be implemented in either a centralized environment, as is presently preferred and described, or a distributed environment, although this would then require an uploading of data in addition to the operations to be described below. The improvements of the present invention can also be applied to networked environments (where distributed files are polled, and the selected data transferred to the user), if desired.

The data base 3 is fully conventional and can include a compilation of any desired class of information, which may be subclassified if desired. The data base 3 can be an existing data base presently accessible without the data base management system 2 of the present invention, or a data base developed to include information intended for access with the data base management system 2 of the present invention. It is even possible for the data base 3 to initially include no present data since, as will be discussed more fully below, the data base management system 2 can operate to initialize the data base 3 as part of its overall function.

Both the terminal 1 and the data base 3 are fully conventional in overall operation, and numerous variations will be readily apparent to the person of ordinary skill in this art. All necessary functions can be implemented in software, as will also be readily apparent to the person of ordinary skill with reference to the following discussion, and with reference to FIG. 2A, which is a block diagram illustrating functions of the data base management system 2 of FIG. 1B in greater detail.

Initially, steps are taken to "sign on" the system, at 4. Any of a variety of conventional accessing procedures can be used for such purposes. It is expected that users of the system (individuals, groups, companies, etc.) will be provided with a dedicated identification number (e.g., a "PIN"), for both identification and accounting purposes. The identification number can be implemented at different levels, if desired. For example, access may be provided to a particular company, at a first level, and to different individuals of that company, at a second level. Session accounting (access/user fees including times, keystrokes, activities, etc.) is monitored, at 5, using any of a variety of desired session accounting functions appropriate to the system employed. Other functions may be associated with the sign on procedure including textual commands (e.g., prompts and visual displays) as well as advertising functions (e.g., announcements of system functions and/or enhancements).

As with the conventional system of FIG. 1A, the above mentioned procedures for signing on the system may include a consultation of secondary data which is maintained separate from the primary data of the data base 3 which is to be accessed by the user. For example, such secondary data may include a PIN listing of active users of the system. Such secondary data may include accounting information related to the users of the system. Such secondary data may further include other parameters related to the overall determination of whether or not a particular user is authorized to access the primary data of the data base 3. Such secondary data may reside in the host computer which contains the primary data forming the data base 3. However, again, the consultation of such secondary data is separate from the consultation of the primary data of the data base 3. The user derives no useful information from the secondary data which is consulted, as distinguished from the primary data, which the user will consult (i.e., query) to derive useful information.

As a consequence, and in accordance with the present invention, the secondary data is only used to allow the user to sign on to the data base management system 2, but is not used to allow the user access to the primary data of the data base 3. In this sense, the secondary data is maintained separate from the primary data, and performs an independent function.

Following sign on, at 4, a "welcome" screen is displayed, at 6. This signifies initial access to the data base management system 2, and can also be associated with additional display functions if desired. With a conventional system, the user would then have been allowed access to the primary data of the data base 3, to make desired queries and to obtain appropriate responses. However, in accordance with the present invention, additional steps must be taken before the user is allowed access to the primary data of the data base 3. Steps are taken (at 7) to "qualify" the user before access is allowed to the primary data of the data base 3 by determining whether certain desired preconditions have been satisfied (in addition to the prior verification of PIN and accounting information related to the user).

In its preferred embodiment, access to the data base 3 is conditioned upon providing certain information useful in maintaining and/or updating the data base 3, for access by other system users. Important to note is that conditioned access to the data base 3 can serve to increase (update) an existing data base, or can serve to initiate (or develop) a data base that is originally empty. In the latter situation, satisfaction of the preconditions to access of the data base by the initial subscribers to the system serves to initiate the data base by providing data for subsequent access by users of the system (i.e., the initial subscribers, and subsequent subscribers).

As previously indicated, the described system is intended for use in developing leads for potential sales efforts. In such case, the precondition established for access to the data base 3 is that the user enter its present needs for addition to the data base 3. This, in turn, allows others to access the data base 3 and identify a particular user's present needs, in turn developing leads for the sales efforts of others. In this case, a "need" is identified as any product and/or service required by the user accessing the system, which may either be an ongoing (regular or repetitive) need, or a single purpose (transient) need of that user.

To determine if the appropriate precondition has been met, a test is performed, at 7, to determine whether the user will qualify for access to the data base 3. If the appropriate precondition has been met, access to the primary data of the data base 3 is permitted, at 8. Otherwise, an opportunity is given to satisfy the appropriate precondition, in turn permitting access to the primary data of the data base 3. Since the precondition to be met is that the user add primary data pertaining to the user to the primary data of the data base 3, the primary data contained by the data base 3 will be increased and updated as a result. This, in turn, provides additional data for access by other users of the system who have similarly met the appropriate precondition for accessing the data base 3.

In the described embodiment, the test 7 entails a check of when the user has last updated its listing of needs. However, this could also entail a check of other factors useful in determining how well the user has maintained its listing of needs. For example, quantitative checks could be employed, including determinations of the number of needs listed over a given period, the number of needs listed relative to the number of leads accessed by the user, or the number of leads listed or leads accessed relative to other users of the system. Qualitative checks could also be employed, including any of a number of determinations based on identified parameters or rules formulated for such purposes. Other factors may be taken into account, as desired, either on an individual basis or in desired combinations.

If the listing of needs has been updated within a prescribed time period (e.g., one week or one month), the test 7 is positive and access to the data base 3 is permitted, at 8. If the test 7 is negative (i.e., the listing has not been updated within the prescribed time period), a second test is performed, at 9. The test 9 is performed to determine whether the user's needs were last updated within a secondary time period prescribed for the system (e.g., two months).

If it is determined that the user's needs have been updated within this secondary time period (although not within the primary time period of the test 7) a warning is displayed at 10. The warning 10 is provided to advise the user that its listing (of needs) has not recently been updated, and that an updated listing will in due course be required to permit continued access to the data base 3. Since the user is at that time considered current, the user is permitted access to the data base 3. However, the user is also provided with an opportunity to update its listing, at 11. If the user elects to presently update its listing, the user is referred to a routine 20 for doing so. If the user elects not to presently update its listing (e.g., in the interests of time or available personnel), the user is allowed access to the data base 3, at 12. This allows the user to continue to access the data base 3 without an interruption in service (i.e., a disconnection).

If it is determined, at 9, that the user's needs have not been updated within the secondary time period allowed for doing so, the user is provided with an opportunity to update its listing, at 13. If the user remains interested in accessing the data base 3, the user must elect to update its listing and is referred to the routine 20. If the user elects not to update its listing, access to the data base 3 is prevented (stop 14) and the user's access number is preferably deactivated (e.g., restricted or terminated).

In conjunction with the foregoing operations, it may be desirable to allow the user certain limited access to secondary functions of the data base 3, such as advertisements posted on the system, announcements, e-mail, or appropriate user assistance information (i.e., a "help" option). Such limited access may be provided in conjunction with the test 9, the update opportunities at 11 and 13, or elsewhere in the system. However, access to the primary data of the data base 3 would generally be prevented at this point.

Figure 2A:
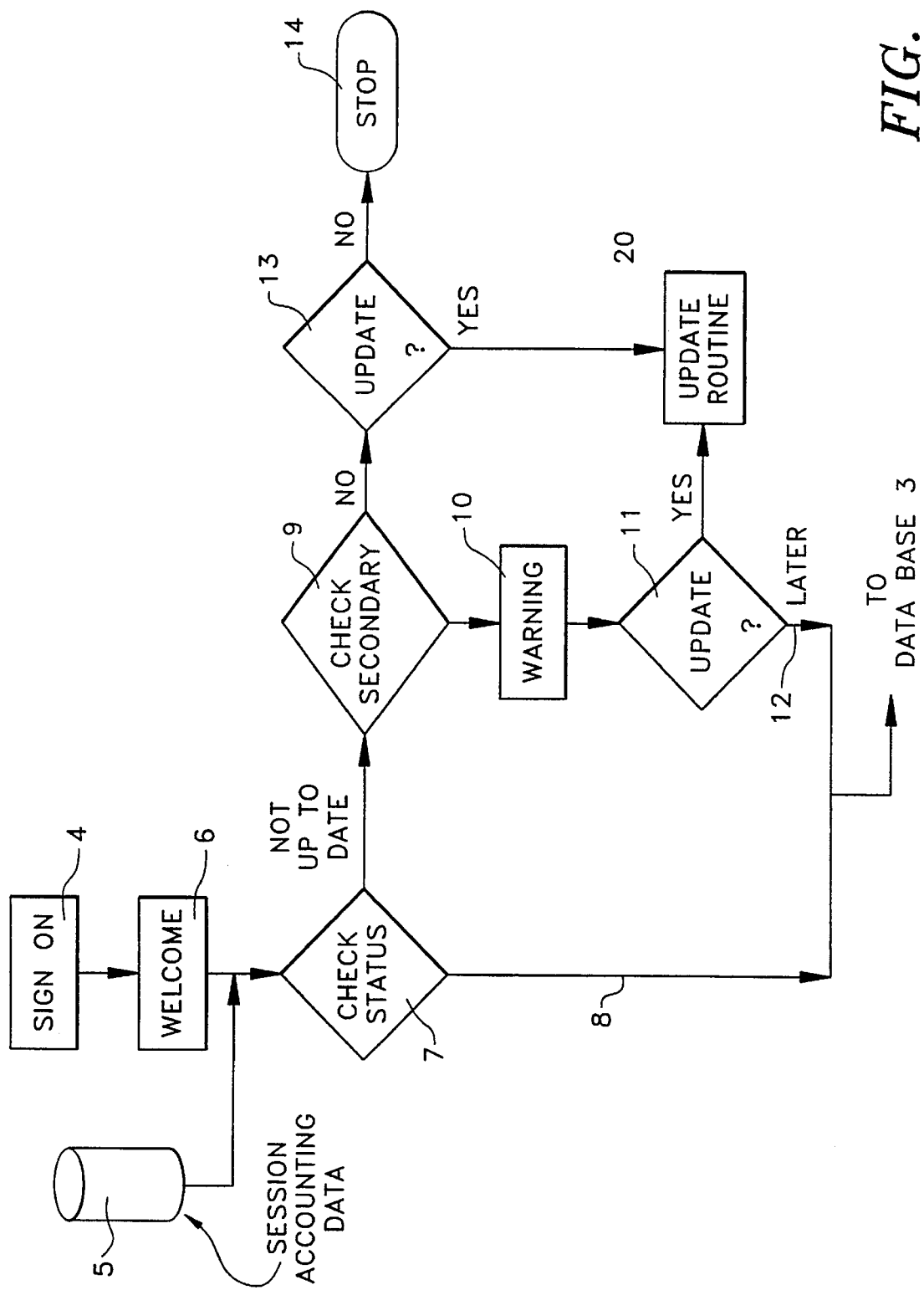
FIGS. 2A, 2B and 2C are flow charts illustrating alternative implementations of the data base management system of FIG. 1B.
Figure 2B:
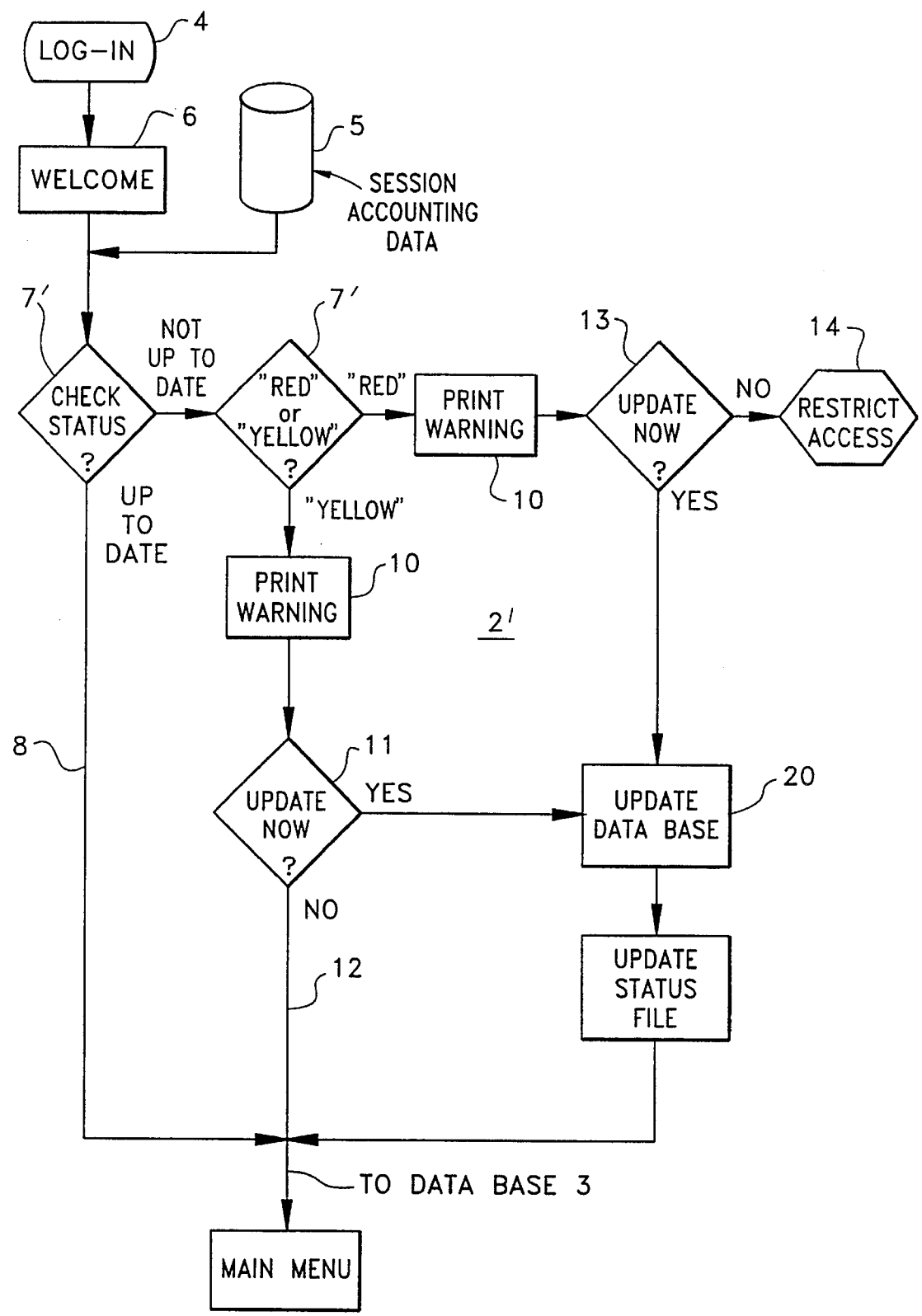
Figure 2C:
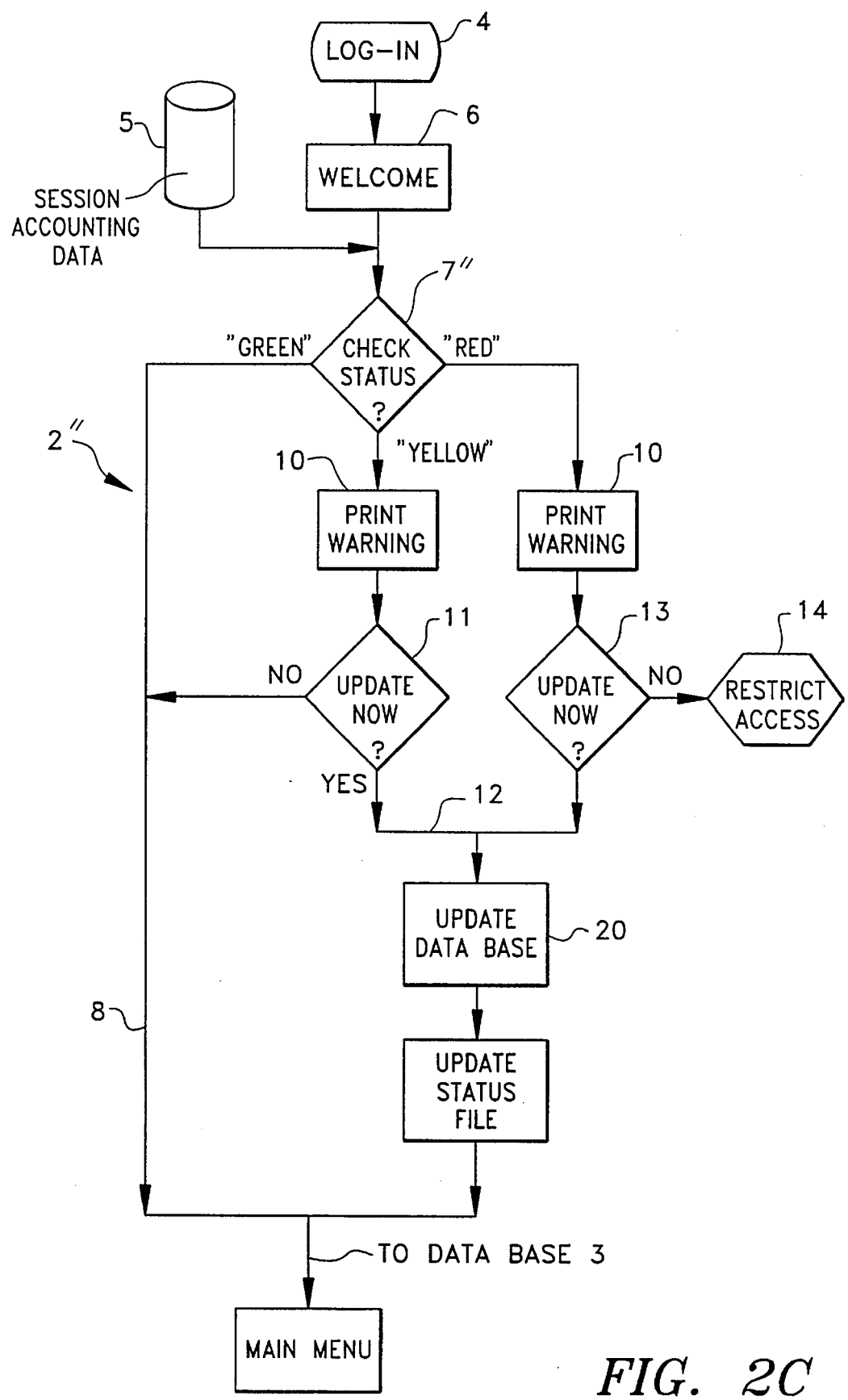

As previously indicated, the necessary functions represented in FIG. 2A are readily implemented by the person of ordinary skill in such endeavors. As a result, the actual implementation of such functions may vary. Examples of this are shown in the block diagrams of FIGS. 2B and 2C. FIG. 2B shows the implementation of a data base management system 2' which employs a two-stage test, at 7'. The two-stage test 7' operates to determine whether the user's listing is up to date (a "green" condition), or not, and whether listings that are not up to date merely call for an update (a "yellow" condition) or are in arrears (a "red" condition). Further action proceeds as previously described in connection with the block diagram of FIG. 2A. FIG. 2C shows the implementation of a data base management system 2" which employs a tri-state test, at 7", in place of the two-stage test 7' of FIG. 2B or the separate tests 7, 9 of FIG. 2A. Again, further action proceeds as previously described.

Figure 3:
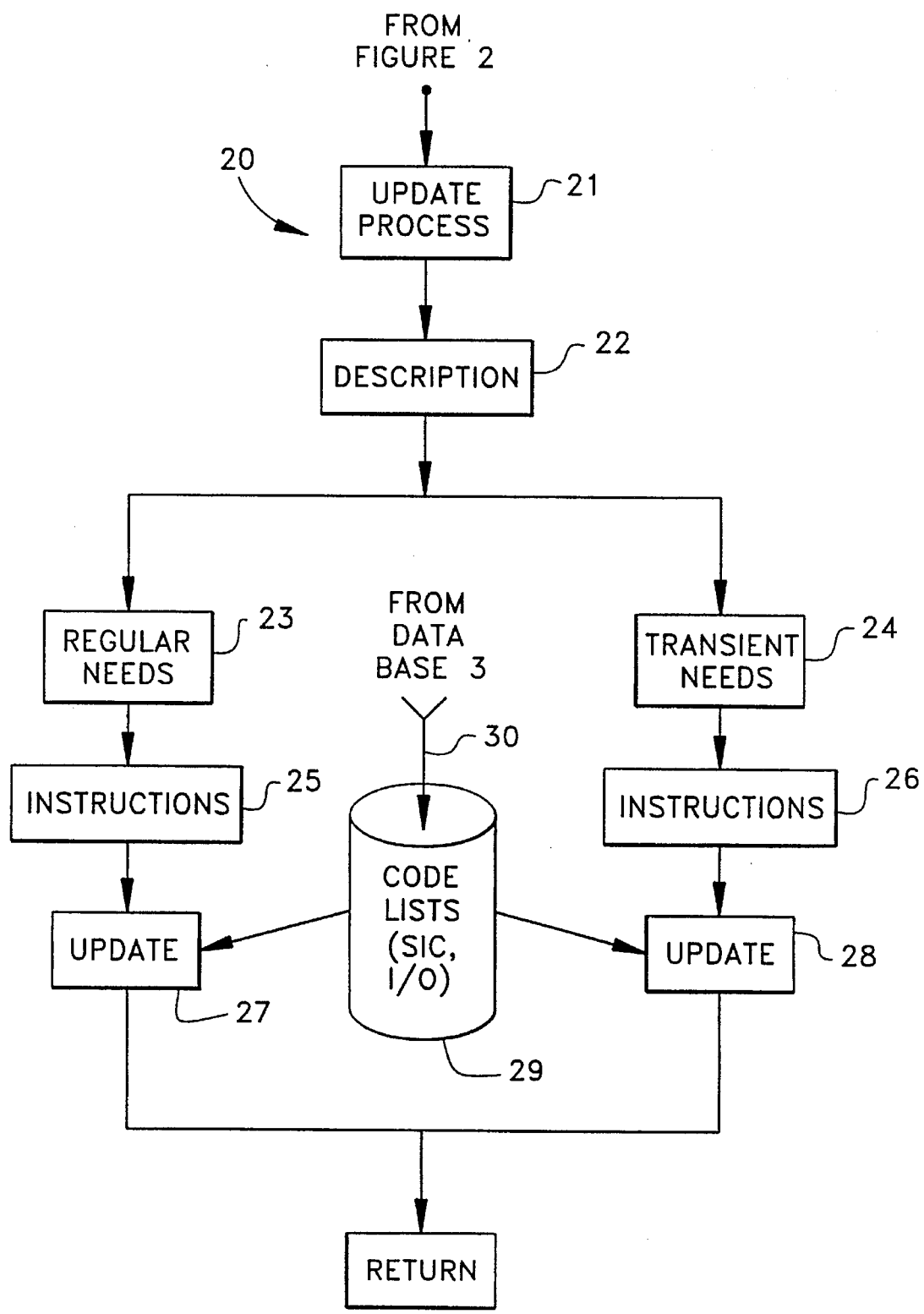
FIG. 3 is a flow chart illustrating the updating of data base information in conjunction with operations of the management system of FIG. 1B.

FIG. 3 is a block diagram illustrating functions of the routine 20 (see FIGS. 2A, 2B and 2C) provided for updating the user's listings. The routine 20 is initiated, at 21, and a description of available procedures (e.g., appropriate screens of descriptive material) is provided at 22. To this end, and in conjunction with a listing of user needs, the user is prompted to update its listing in either, or both of two categories including regular (ongoing) needs, at 23, as well as transient (ad hoc) needs, at 24. The user is prompted at 22, and is provided with an opportunity to select between the two available categories.

In the event that the user elects to update its regular needs, at 23, instructions are provided for doing so, at 25. This can include any of a variety of instructions for completing configured data entry "cards" designed to integrate the user's needs into the data base 3 (and its various fields). The information cards can be developed in any format, depending upon the configuration of the data base 3 and the particular fields of information that the data base 3 can accommodate.

In the event that the user elects to update its transient needs, at 24, instructions for doing so are similarly displayed, at 26, allowing the user to enter its transient needs in similar fashion. However, it is expected that the user's transient needs will be identified as such, to separate them from the user's ongoing needs and to allow other users of the system to better direct their search for leads best suited to their business endeavors. Other transient data functions can be provided, if desired, and would be similarly accessible, at 26. This could include the entry of user profiles, advertisements and system announcements, or other information of interest to users of the system (including the previously described system functions of limited access).

A variety of methods may be used to categorize the needs (either ongoing or transient) that come to be entered into the data base 3. However, in accordance with the present invention it is preferred to employ the Standard Industrial Classification ("SIC") codes developed by the Federal Government for identifying goods and/or services for purposes of categorization. SIC codes are four, five or seven digit codes which are universally employed, and which are therefore well suited to organization of the data base 3 for purposes of categorizing the needs of users of the system. In the event that the user is familiar with the SIC codes relevant to its needs, the system will provide appropriate prompts for completing the data cards, e.g., at 27, 28. To this end, a space (i.e., a field) will be shown for entering the appropriate code. In the event that the user is not familiar with the appropriate SIC codes to be employed, the user is allowed access to a listing of SIC codes, at 29, to search for the appropriate codes associated with particular goods and/or services. Conventional searching functions are preferably provided for identifying goods and/or services, and their associated codes. Users of the data base 3 are also preferably provided access (shown at 30) to the listing 29, to allow SIC codes to be searched and identified for purposes of facilitating a search to be performed, or in progress.

While the use of SIC codes is presently preferred for such purposes, other codes may be similarly employed including standardized codes and codes tailored to a particular data base 3. This can include codes with different levels of specificity, if desired. For example, the system may employ, at a first level, an input/output (I/O) code for designating general categories of goods and/or services, in conjunction with a use of SIC codes, at a second level, for purposes of more specifically identifying the goods and/or services within a designated general category. In any event, the user of the system should be provided with a high degree of specificity for identifying its needs, and for later identifying potential leads upon access to the data base 3. This serves to enhance the probability that an identified need will be accessed by suppliers able to satisfy that need, and that identified leads will be productive and profitable.

Although the foregoing is discussed in terms of a data base 3 configured for categorizing needs and identifying leads making use of such information, the data base management system 2 can also be used for other purposes including, but in no way limited to bartering networks (e.g., a "technology exchange"), financial data networks (e.g., for "credit/payment monitoring"), exchange networks (e.g., a "stock exchange") or personal services (e.g., a "dating service"). Essentially, the data base management system 2 can be used as an interface to any data base, for collecting information of any kind to either initiate or maintain the data base, particularly where it is desirable to ensure periodic updating of the data base as a precondition to its access. It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for regulating access to a data base for containing primary data to be accessed by a user and secondary data to authorize access to the primary data of the data base by the user, from a terminal for interfacing with the user and including means for communicating with the data base so that the primary data and the secondary data of the data base can be obtained, the apparatus comprising:

means associated with the communicating means, for limiting access to the primary data of the data base responsive to a selected precondition so that the communicating means is enabled for communication with the primary data when the selected precondition has been satisfied and disabled from communication with the primary data when the selected precondition has not been satisfied;

wherein the selected precondition includes an input of primary data pertaining to the user, for addition to the primary data forming part of the data base.

2. The apparatus of claim 1 which further includes means associated with the communicating means, for entering the primary data pertaining to the user, and means for adding the primary data pertaining to the user to the primary data forming part of the data base to satisfy the selected precondition.

3. The apparatus of claim 2 wherein the primary data entering means includes separate means for entering repetitive data and means for entering transient data.

4. The apparatus of claim 2 wherein the primary data entering means operates in conjunction with means for encoding the primary data entering the data base.

5. The apparatus of claim 4 wherein the encoding means operates on plural levels.

6. The apparatus of claim 4 wherein the encoding means operates responsive to a standard industrial classification code.

7. The apparatus of claim 4 wherein the encoding means operates responsive to an input/output code.

8. The apparatus of claim 2 which further includes means associated with the communicating means, for entering secondary data pertaining to the user, and means for comparing the secondary data pertaining to the user with the secondary data to authorize access to the primary data of the data base by the user.

9. The apparatus of claim 8 wherein the means for entering the secondary data, and the comparing means, communicate with the access limiting means.

10. The apparatus of claim 9 wherein the access limiting means operates responsive to the comparing means.

11. The apparatus of claim 8 wherein the secondary data includes a personal identification number.

12. The apparatus of claim 8 wherein the secondary data includes an account of user access fees.

13. The apparatus of claim 1 which further includes means for monitoring the access limiting means, and a parameter associated with the access limiting means.

14. The apparatus of claim 13 wherein the parameter has a numerical value, and wherein the monitoring means includes means for counting the numerical value of the parameter.

15. The apparatus of claim 14 wherein the parameter is time.

16. The apparatus of claim 14 wherein the parameter is an amount of primary data pertaining to the user which is added to the primary data of the data base.

17. The apparatus of claim 1 wherein the primary data is a listing of items needed by users of the data base.

18. The apparatus of claim 1 wherein the access limiting means includes means for testing compliance with the selected precondition.

19. The apparatus of claim 1 wherein the access limiting means includes means for testing compliance with the selected precondition within a defined time period.

20. The apparatus of claim 1 wherein the data base is initially empty of primary data.

21. The apparatus of claim 1 wherein the data base initially contains primary data.

22. An apparatus for regulating access to a data base for containing primary data to be accessed by a user and secondary data to authorize access to the primary data of the data base by the user, from a terminal for interfacing with the user and including means for communicating with the data base so that the primary data and the secondary data of the data base can be obtained, the apparatus comprising:

means associated with the communicating means, for limiting access to the primary data of the data base responsive to a selected precondition so that the communicating means is enabled for communication with the primary data when the selected precondition has been satisfied and disabled from communication with the primary data when the selected precondition has not been satisfied;

wherein the selected precondition includes an input of primary data pertaining to the user, for addition to the primary data forming part of the data base; and means associated with the communicating means, for controlling access to the access limiting means, including means for comparing secondary data pertaining to the user with the secondary data to authorize access to the primary data of the data base by the user.

23. The apparatus of claim 22 which further includes means associated with the communicating means, for entering the primary data pertaining to the user, and means for adding the primary data pertaining to the user to the primary data forming part of the data base to satisfy the selected precondition.

24. The apparatus of claim 23 which further includes means associated with the communicating means, for entering the secondary data pertaining to the user, for comparison with the secondary data to authorize access to the primary data of the data base by the user.

25. A method for regulating access to a data base for containing primary data to be accessed by a user and secondary data to authorize access to the primary data of the data base by the user, from a terminal for interfacing with the user by communicating with the data base so that the primary data and the secondary data of the data base can be obtained, the method comprising the steps of:

limiting access to the primary data of the data base responsive to a selected precondition so that communication with the primary data is enabled when the selected precondition has been satisfied and disabled when the selected precondition has not been satisfied;

wherein the selected precondition includes an input of primary data pertaining to the user, for addition to the primary data forming part of the data base.

26. The method of claim 25 which further includes the steps of entering the primary data pertaining to the user, and adding the entered primary data to the primary data of the data base to satisfy the selected precondition.

27. The method of claim 26 which further includes the steps of entering secondary data pertaining to the user, and comparing the secondary data pertaining to the user with the secondary data to authorize access to the primary data of the data base by the user.

28. The method of claim 27 wherein the entering of the secondary data, and the comparing, precedes the access limiting step.

29. The method of claim 28 wherein the access limiting step is responsive to the comparing step.

30. The method of claim 27 wherein the secondary data includes a personal identification number.

31. The method of claim 27 wherein the secondary data includes an account of user access fees.

32. The method of claim 26 wherein the entering of the primary data includes a separate entering of repetitive data and entering of transient data.

33. The method of claim 26 which further includes the step of encoding the primary data added to the data base.

34. The method of claim 33 wherein the encoding occurs on plural levels.

35. The method of claim 33 wherein the encoding is responsive to a standard industrial classification code.

36. The method of claim 33 wherein the encoding is responsive to an input/output code.

37. The method of claim 25 wherein the access limiting step further includes monitoring a parameter associated with the access limiting step.

38. The method of claim 37 wherein the parameter has a numerical value, and wherein the monitoring step further includes counting the numerical value of the parameter.

39. The method of claim 38 wherein the parameter is time.

40. The method of claim 38 wherein the parameter is an amount of primary data pertaining to the user which is added to the primary data of the data base.

41. The method of claim 25 wherein the primary data is a listing of items needed by users of the data base.

42. The method of claim 25 wherein the access limiting step includes testing for compliance with the selected precondition.

43. The method of claim 25 wherein the access limiting step includes testing compliance with the selected precondition within a defined time period.

44. The method of claim 25 wherein the data base is initially empty of primary data.

45. The method of claim 25 wherein the data base initially contains primary data.

46. A method for regulating access to a data base for containing primary data to be accessed by a user and secondary data to authorize access to the primary data of the data base by the user, from a terminal for interfacing with the user by communicating with the data base so that the primary data and the secondary data of the data base can be obtained, the method comprising the steps of:

limiting access to the primary data of the data base responsive to a selected precondition so that communication with the primary data is enabled when the selected precondition has been satisfied and disabled when the selected precondition has not been satisfied;

wherein the selected precondition includes an input of primary data pertaining to the user, for addition to the primary data forming part of the data base; and comparing secondary data pertaining to the user with the secondary data to authorize access to the primary data of the data base by the user, prior to the access limiting step.

47. The method of claim 46 which further includes the steps of entering the primary data pertaining to the user, and adding the primary data pertaining to the user to the primary data forming part of the data base to satisfy the selected precondition.

48. The method of claim 47 which further includes the steps of entering the secondary data pertaining to the user, for comparison with the secondary data to authorize access to the primary data of the data base by the user.

* * * * *

US005623660C1

(12) EX PARTE REEXAMINATION CERTIFICATE (8583rd)
United States Patent
Josephson

(10) Number: US 5,623,660 C1
(45) Certificate Issued: Oct. 4, 2011

(54) SYSTEM FOR REGULATING ACCESS TO DATA BASE FOR PURPOSES OF DATA BASE MANAGEMENT

(75) Inventor: Jeffrey L. Josephson, Moorestown, NJ (US)

(73) Assignee: Data Match Enterprises of Texas, LLC, Marshall, TX (US)

Reexamination Request:
No. 90/010,636, Dec. 16, 2009

Reexamination Certificate for:
Patent No.: 5,623,660
Issued: Apr. 22, 1997
Appl. No.: 08/537,541
Filed: Oct. 2, 1995

Related U.S. Application Data

(63) Continuation-in-part of application No. 08/231,035, filed on Apr. 22, 1994, now abandoned.

(51) Int. Cl.
*G06F 13/00* (2006.01)

(52) U.S. Cl. .................. 395/609; 711/150; 711/151; 711/152; 711/164; 709/229; 726/2; 707/999.009
(58) Field of Classification Search .................. None
See application file for complete search history.

(56) References Cited

U.S. PATENT DOCUMENTS

| | | | |
|---|---|---|---|
| 4,903,201 A | | 2/1990 | Wagner |
| 5,032,989 A | | 7/1991 | Tornetta |
| 5,046,084 A | * | 9/1991 | Barrett et al. .......... 379/102.06 |
| 5,283,731 A | | 2/1994 | Lalonde et al. |
| 5,475,375 A | | 12/1995 | Barrett et al. |
| 5,500,793 A | | 3/1996 | Deming, Jr. et al. |
| 5,592,375 A | | 1/1997 | Salmon et al. |
| 5,924,082 A | | 7/1999 | Silverman et al. |

OTHER PUBLICATIONS

818 Are Code BBSes Through history (80's Version), Map of the 818 Area Code, available at http://bbslist.textfiles.com/818/oldschool.html, on Feb. 15, 2008, pp. 1–22.
Barden, Bartering Clubs Prosper in Computer Age, The New York Times, Dec. 19, 1981,available at http://www.lexisnexis.com.libproxy.mit.edu/us/Inacademic/delivery/PrintDoc.do?from Cart..., on Apr. 22, 2008, pp. 1–3.
Bowen et al., The Complete Electronic Bulletin Board Starter Kit, Bantam Books, 1988, pp. 1–435, 1988.
Brown, The Resume File: A Job–Seeker's Resource Board, ABI/INFORM Global, Sep./Oct. 1994, pp. 16–17.
Cavazos et al., System Operator Liability for a User's Copyright Infringement, Texas Intellectual Property Law Journal, V. 4:13, 1995, pp. 13–31.
Crawford, Modern System of Bartering Offers Total Freedom, The Herald, Feb. 13, 1993, p. 16, available at http://www.lexisnexis.com.libproxy.mit.edu/us/Inacademic/delivery/PrintDoc.do?fromCart... on Apr. 22, 2008, pp. 1–2.
Delfino, "Transfer, Please"—The Low–down On Downloading, Online, May 1994, pp. 112–114.

(Continued)

*Primary Examiner* — Rachna S Desai

(57) ABSTRACT

A data base is made accessible with a data base management system that not only regulates access to the data base, but which also promotes expansion (growth) of the data base on an ongoing basis as part of such regulation. For the purpose of developing leads for promoting sales efforts, a data base is provided which assembles the needs of users of the system, for access by other users to identify potential sales leads. The data base management system provides access to the needs compiled by the data base, identifying qualified leads, but only upon the condition that users of the system first identify their needs. In this way, a constant source of leads is made available, based upon the present and actual needs of other users, and the leads that are obtained are more likely to give rise to a useful result.

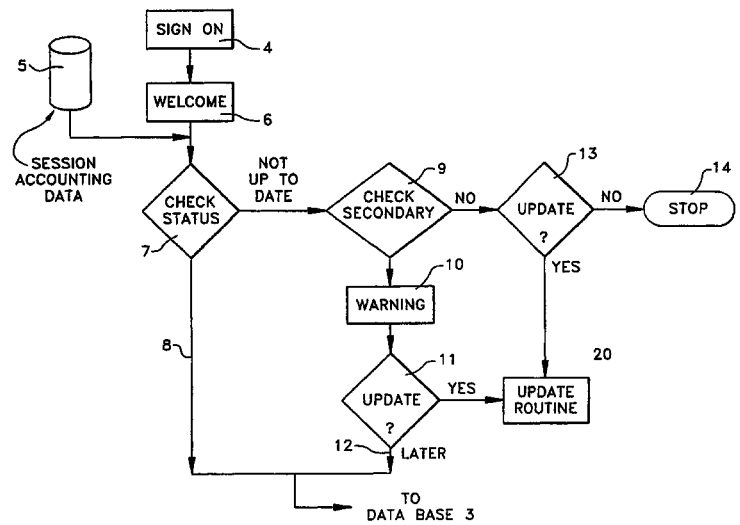

OTHER PUBLICATIONS

DR Matcher, User Instructions, Author: unknown, Publisher: unknown, Jan. 31, 1989, pp. 1–8.

Jackson, The Marketing Integration Puzzle: A Financial Services Database Development and Application Case Study, Direct Marketing, Sep./Oct. 1992, pp. 53–58.

Jasmine, Third in a Series Local Connections If You're New to the Online Universe, Bulletin Board Systems Are Definitely Your Best Bet for Getting Your Feet Wet; [MET Edition], Toronto Star, Nov. 3, 1994, available at http://proquest.umi.com/pgdweb?did=518174421&sid=1&Fmt=3&8clientId=10843&RQT=309&VName=PQD, pp. 1–4.

Keery, Electronic Gifts: Teenage Pirates and the Junior Underworld, The Independent, Dec. 11, 1992, p. 31, available at http://www.lexisnexis.com.libproxy.mit.edu/us/Inacademic/delivery/printDoc.do?fromCart... on Apr. 9, 2008, pp. 1–2.

Kleiman, The Modern–Day Swap, Small Business Reports, Apr. 1992, pp. 20–24.

Meyer, The Computer Personals: Meeting Your Match Online, Link Up, V. 1, N. 10, Jul. 1984, pp. 38–40.

Nordheimer, As Economy Goes Bust, Barter Is Booming, The New York Times, Mar. 14, 1992, sec. 1, p. 27, col. 2, available at http://www.lexisnexis.com.libproxy.mit.edu/us/Imacademic/delivery/PrintDoc.do?from cart... Apr. 22, 2008, pp. 1–3.

Patz DrMatcher, BBS, Jan. 28, 1990, pp. 1–26.

Romancing The Internet, "Relationals"—Redifining the Dating Industry, Author: unknown, Business Wire, Jul. 12, 1995, pp. 1–2.

Scharlott et al., Overcoming Relationship–Initiation Barriers: The Impact of a Computer–Dating System on Sex Role, Shyness, and Appearance Inhibitions, Computers in Human Behavior, V. 11, N. 2, 1995, pp. 191–204.

Shardanand et al., Social Information Filtering: Algorithms for Automating "Word of Mouth", ACM, Mit Media–Lab; 1995, pp. 1–13.

Woody, User Profiler, Version 1.0, Installation Procedure, Publisher: unknown, 1995, pp. 1–8.

Yuen, Some Computers Shoot Electronic Arrows, Softtalk, Feb. 1983, pp. 164–168.

Zeidenberg, Small Business Computerized Barter Clubs Elimate Cash Deals, The Globe and Mail, Jan. 20, 1992, pp. 1–3.

Yuen, Matthew, "Some Computers Shoot Electronic Arrows", Softalk, vol. 3, pp. 164–168, Feb. 1983.

* cited by examiner

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 8, 18, 22-27 and 42 are cancelled.

New claims 49-94 are added and determined to be patentable.

Claims 3-7, 9-17, 19-21, 28-41 and 43-48 were not reexamined.

*49. The method of claim 25, further comprising:*

*checking a first status of the user by testing whether the inputted primary data pertaining to the user has been updated within a first time period, and*

*checking, upon a determination that the inputted primary data pertaining to the user was not updated within the first time period, a second status of the user by testing whether the inputted primary data pertaining to the user has been updated within a second time period.*

*50. The method of claim 49, further comprising:*

*warning, upon a determination that the inputted primary data pertaining to the user has been updated within the second time period, the user that the inputted primary data pertaining to the user was not updated within the first time period.*

*51. The method of claim 50, further comprising:*

*offering the user an option to update the inputted primary data pertaining to the user.*

*52. The method of claim 51, further comprising:*

*allowing, after the user declines the option, the user to access the primary data of the data base.*

*53. The method of claim 51, further comprising:*

*updating, after the user accepts the option, the inputted primary data pertaining to the user.*

*54. The method of claim 53, further comprising:*

*allowing, after the updating, the user to access the primary data of the data base.*

*55. The method of claim 49, further comprising:*

*requiring, upon a determination that the inputted primary data pertaining to the user was not updated within the second time period, the user to update the inputted primary data pertaining to the user.*

*56. The method of claim 55, further comprising:*

*updating, after the user accepts the requirement, the inputted primary data pertaining to the user.*

*57. The method of claim 56, further comprising:*

*allowing, after the updating, the user to access the primary data of the data base.*

*58. The method of claim 55, further comprising:*

*stopping, after the user refuses the requirement, the user from accessing the primary data of the data base.*

*59. The method of claim 25, further comprising:*

*checking a first status of the user by testing whether the inputted primary data pertaining to the user has been updated within a first time period, and*

*allowing, upon a determination that the inputted primary data pertaining to the user was not updated within the first time period, the user limited access to secondary functions while stopping the user from accessing the primary data of the data base.*

*60. The method of claim 49, further comprising:*

*allowing, upon a determination that the inputted primary data pertaining to the user has been updated within the second time period, the user limited access to secondary functions while stopping the user from accessing the primary data of the data base.*

*61. The method of claim 25, wherein satisfying the selected precondition includes determining that a number of needs listed by the user relative to a number of leads listed by other users is sufficient.*

*62. The method of claim 25, wherein satisfying the selected precondition includes determining that a number of needs accessed by the user relative to a number of leads accessed by other users is sufficient.*

*63. The method of claim 25, further comprising:*

*prompting the user to select at least one category of the primary data pertaining to the user, and*

*prompting the user, upon a selection by the user to update a regular needs category of the primary data, by providing instructions to the user for updating the regular needs category of the primary data pertaining to the user.*

*64. The method of claim 63, further comprising:*

*wherein the instructions are for completing data entry cards configured to integrate the user's updated regular needs into the data base.*

*65. The method of claim 64, further comprising:*

*providing access to a listing of Standard Industrial Classification Codes (SIC) associated with the user's updated regular needs.*

*66. The method of claim 25, further comprising:*

*prompting the user to select at least one category of the primary data pertaining to the user, and*

*prompting the user, upon a selection by the user to update a transient needs category of primary data, by providing instructions to the user for updating the transient needs category of primary data pertaining to the user.*

*67. The method of claim 66, further comprising:*

*wherein the instructions are for completing data entry cards configured to integrate the user's updated regular needs into the data base.*

*68. The method of claim 67, further comprising:*

*providing access to a listing of Standard Industrial Classification Codes (SIC) associated with the user's updated regular needs.*

*69. The method of claim 25, further comprising:*

*prompting the user to select at least one category of the primary data pertaining to the user, and*

*prompting the user, upon a selection by the user to update a regular needs category of primary data and to update a transient needs category of primary data, by providing instructions to the user for updating the regular needs category of primary data pertaining to the user and the transient needs category of primary data pertaining to the user.*

70. The method of claim 69, further comprising:
   wherein the instructions are for completing data entry cards configured to integrate the user's updated regular needs and the user's updated transient needs into the data base.

71. The method of claim 70, further comprising:
   providing access to a listing of Standard Industrial Classification Codes (SIC) associated with the user's updated regular needs and the user's updated transient needs.

72. The apparatus of claim 1, further configured to perform the following functions:
   checking a first status of the user by testing whether the inputted primary data pertaining to the user has been updated within a first time period, and
   checking, upon a determination that the inputted primary data pertaining to the user was not updated within the first time period, a second status of the user by testing whether the inputted primary data pertaining to the user has been within a second time period.

73. The apparatus of claim 72, further configured to perform the following function:
   warning, upon a determination that the inputted primary data pertaining to the user has been updated within the second time period, the user that the inputted primary data pertaining to the user was not updated within the first time period.

74. The apparatus of claim 73, further configured to perform the following function:
   offering the user an option to update the inputted primary data pertaining to the user.

75. The apparatus of claim 74, further configured to perform the following function:
   allowing, after the user declines the option, the user to access the primary data of the data base.

76. The apparatus of claim 74, further configured to perform the following function:
   updating, after the user accepts the option, the inputted primary data pertaining to the user.

77. The apparatus of claim 76, further configured to perform the following function:
   allowing, after the updating, the user to access the primary data of the data base.

78. The apparatus of claim 72, further configured to perform the following function:
   requiring, upon a determination that the inputted primary data pertaining to the user was not updated within the second time period, the user to update the inputted primary data pertaining to the user.

79. The apparatus of claim 78, further configured to perform the following function:
   updating, after the user accepts the requirement, the inputted primary data pertaining to the user.

80. The apparatus of claim 79, further configured to perform the following function:
   allowing, after the updating, the user to access the primary data of the data base.

81. The apparatus of claim 78, further configured to perform the following function:
   stopping, after the user refuses the requirement, the user from accessing the primary data of the data base.

82. The apparatus of claim 1, further configured to perform the following functions:
   checking a first status of the user by testing whether the inputted primary data pertaining to the user has been updated within a first time period, and
   allowing, upon a determination that the inputted primary data pertaining to the user was not updated within the first time period, the user limited access to secondary functions while stopping the user from accessing the primary data of the data base.

83. The apparatus of claim 72, further configured to perform the following function:
   allowing, upon a determination that the inputted primary data pertaining to the user has been updated within the second time period, the user limited access to secondary functions while stopping the user from accessing the primary data of the data base.

84. The apparatus of claim 1, wherein satisfying the selected precondition includes determining that a number of needs listed by the user relative to a number of leads listed by other users is sufficient.

85. The apparatus of claim 1, wherein satisfying the selected precondition includes determining that a number of needs accessed by the user relative to a number of leads accessed by other users is sufficient.

86. The apparatus of claim 1, further configured to perform the following functions:
   prompting the user to select at least one category of the primary data pertaining to the user, and
   prompting the user, upon a selection by the user to update a regular needs category of the primary data, by providing instructions to the user for updating the regular needs category of the primary data pertaining to the user.

87. The apparatus of claim 86, further configured to perform the following function:
   wherein the instructions are for completing data entry cards configured to integrate the user's updated regular needs into the data base.

88. The apparatus of claim 87, further configured to perform the following function:
   providing access to a listing of Standard Industrial Classification Codes (SIC) associated with the user's updated regular needs.

89. The apparatus of claim 1, further configured to perform the following functions:
   prompting the user to select at least one category of the primary data pertaining to the user, and
   prompting the user, upon a selection by the user to update a transient needs category of primary data, by providing instructions to the user for updating the transient needs category of primary data pertaining to the user.

90. The apparatus of claim 89, further configured to perform the following function:
   wherein the instructions are for completing data entry cards configured to integrate the user's updated regular needs into the data base.

91. The apparatus of claim 90, further configured to perform the following function:
   providing access to a listing of Standard Industrial Classification Codes (SIC) associated with the user's updated regular needs.

92. The apparatus of claim 1, further configured to perform the following functions:
   prompting the user to select at least one category of the primary data pertaining to the user, and
   prompting the user, upon a selection by the user to update a regular needs category of primary data and to update a transient needs category of primary data, by providing instructions to the user for updating the regular needs category of primary data pertaining to the user and the transient needs category of primary data pertaining to the user.

93. The apparatus of claim 92, further configured to perform the following function:
   wherein the instructions are for completing data entry cards configured to integrate the user's updated regular needs and the user's updated transient needs into the data base.

94. The apparatus of claim 93, further configured to perform the following function:
   providing access to a listing of Standard Industrial Classification Codes (SIC) associated with the user's updated regular needs and the user's updated transient needs.

* * * * *